United States Patent
Ederyd

(10) Patent No.: US 11,976,011 B2
(45) Date of Patent: May 7, 2024

(54) METHODS OF BORONIZING SINTERED BODIES AND TOOLS FOR COLD FORMING OPERATIONS AND HOLLOW WEAR PARTS WITH BORONIZED SINTERED BODIES

(71) Applicant: HYPERION MATERIALS & TECHNOLOGIES INC., Worthington, OH (US)

(72) Inventor: Stefan Sven-Olov Ederyd, Saltsjd-Boo (SE)

(73) Assignee: HYPERION MATERIALS & TECHNOLOGIES, INC., Worthington, OH (US)

( * ) Notice: Subject to any disclaimer, the term of this patent is extended or adjusted under 35 U.S.C. 154(b) by 465 days.

(21) Appl. No.: 17/289,689

(22) PCT Filed: Oct. 30, 2018

(86) PCT No.: PCT/EP2018/079759
§ 371 (c)(1),
(2) Date: Apr. 28, 2021

(87) PCT Pub. No.: WO2020/088748
PCT Pub. Date: May 7, 2020

(65) Prior Publication Data
US 2021/0403384 A1    Dec. 30, 2021

(51) Int. Cl.
*C04B 35/563*    (2006.01)
*B21C 3/02*    (2006.01)
(Continued)

(52) U.S. Cl.
CPC ............. *C04B 35/563* (2013.01); *B21C 3/02* (2013.01); *B26F 3/004* (2013.01); *C04B 35/5626* (2013.01); *C04B 2235/386* (2013.01)

(58) Field of Classification Search
CPC .................................................. C04B 35/5626
See application file for complete search history.

(56) References Cited

U.S. PATENT DOCUMENTS

| | | | |
|---|---|---|---|
| 2,379,432 A * | 7/1945 | Heany | B24C 5/04 |
| | | | 138/40 |
| 3,736,107 A | 5/1973 | Hale | |
| 2007/0110607 A1* | 5/2007 | Iwasaki | C22C 29/08 |
| | | | 419/15 |

FOREIGN PATENT DOCUMENTS

| | | | |
|---|---|---|---|
| CA | 1173704 | * | 9/1984 |
| CN | 101263236 A | | 9/2008 |

(Continued)

*Primary Examiner* — Tabatha L Penny
(74) *Attorney, Agent, or Firm* — Ari G. Zytcer

(57) ABSTRACT

Provided is a wear resistant, sintered body made of a binderless carbide, cermet or cemented carbide, e.g., WC, W2C and/or eta-phase, with a grain size less than 6.0 μm, and less than 6% binder phase (e.g., Co—Ni—Fe). At least some working surfaces of the sintered body are surface treated with a boron yielding method including applying a low viscosity liquid medium having boron or aluminum content and heating at 1200° C. to 1450° C. under a pressure less than atmospheric pressure or a hydrogen containing atmosphere to from a hardness gradient with an increased hardness of the treated working surfaces of at least 50 to 200 HV5 and favorable compressive stresses in a surface zone that gives a tougher working surfaces of the boronized sintered bodies.

11 Claims, 22 Drawing Sheets

(51) Int. Cl.
*B26F 3/00* (2006.01)
*C04B 35/56* (2006.01)

(56) References Cited

FOREIGN PATENT DOCUMENTS

| | | | |
|---|---|---|---|
| CN | 105586523 | A | 5/2016 |
| EP | 0493352 | | 7/1992 |
| EP | 0493352 | A | 7/1992 |
| JP | S60155573 | * | 8/1985 |
| JP | H61-146009 | A | 5/1994 |
| JP | 2000-514723 | A | 11/2000 |
| JP | 2006-037160 | A | 2/2006 |
| JP | 2006-188749 | A | 7/2006 |
| JP | 2008272892 | * | 11/2008 |
| JP | 2020-504780 | A | 2/2020 |
| WO | 98/03689 | A | 1/1998 |

* cited by examiner

GRADE II BN

GRADE I BN

GRADE I BN+Al$_2$O$_3$

200

210

GRADE IV BN

- - - 200

GRADE III BN

GRADE III BN+Al$_2$O$_3$

GRADE V BN+Al₂O₃

GRADE II

400

METHODS OF BORONIZING SINTERED BODIES AND TOOLS FOR COLD FORMING OPERATIONS AND HOLLOW WEAR PARTS WITH BORONIZED SINTERED BODIES

This is a National Phase Application filed under 35 U.S.C. 371 as the national stage of PCT/EP2018/079759, filed on Oct. 30, 2018, the entire content of which is hereby incorporated by reference in its entirety.

TECHNICAL FIELD AND INDUSTRIAL APPLICABILITY

The present disclosure relates generally to a wear resistant, sintered body of a binderless carbide (BC), cermet or cemented carbide (CC) in which the sintered body consists primarily of hard phases with an ultrafine grain size and a low binder-phase content. The sintered body is boron treated to obtain a functionally graded character in specific volumes of the body. The functionally graded character of the sintered body increases hardness, produces favorable compressive stresses in the surface, and improves erosion and abrasion wear resistance of the sintered body. The present disclosure also relates to a method to boron treat a wear resistant sintered body to obtain a functionally graded character in specific volumes of the body.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Cemented carbide, cermet and binderless carbide are used in applications requiring high hardness and high wear resistance. Typical applications for these hard materials include seals, bearings, cold heading dies, nozzles for abrasive fluid and cold forming tools, e.g. wire drawing dies. Several methods to boronize a surface of cemented carbide (CC) have been previously described, including: covering the cemented carbide surface with a paste that has a composition of boron material, an activator and a filler to maintain a boronized surface; the formation and distribution of a type of eta-phase (third quarternary phase comprised of tungsten (W), boron (B), carbon (C), cobalt (Co) and/or nickel (Ni)) in the microstructure of the cemented carbide during sintering of compacted cemented carbide powder; and formation of boride layers onto cemented carbide substrates by using boron containing gases or boron-yielding material with a filler. Relevant information related to cemented carbide material and methods to manufacture such cemented carbide material with boronizing treatments can be found in U.S. Pat. Nos. 6,464,748; 5,948,523; and U.S. Patent Application Publication No. 2015/0307980, the disclosures of each of which are incorporated herein by reference.

Nevertheless, despite the current knowledge on boronizing, an issue remains with boronizing wear surfaces of drawing dies, nozzles, and other small sized or hard to access surfaces because of the difficulty of applying the prior boronizing techniques, such as boron paste, and the ability to obtain an efficient boron diffusion reaction in an opening, a channel, or a bore with a small diameter, particularly diameters of 1-2 mm or less.

SUMMARY

In general, the disclosure is directed to a wear resistant, sintered body (e.g., a drawing die nib or a nozzle). The body is made of a binderless carbide, cermet or cemented carbide having primarily hard phases with ultrafine grain size and low binder-phase content. The sintered body includes WC and/or $W_2C$ and/or eta-phase with a grain size less than 6.0 µm. In some embodiments, the sintered body includes less than 6% binder phase (e.g., Co—Ni—Fe). The sintered body includes a surface treated with a boron yielding method (i.e., boronizing) that includes a low viscosity liquid medium having, for example, boron nitride and a surfactant. The liquid medium has a viscosity that is sufficient to apply sufficient boronizing agent in a controlled manner while also being able to be applied in areas difficult to reach by conventional means (e.g., onto a bore surface of the drawing die nib or an inner diameter surface of a nozzle for a water jet cutting apparatus, having a bore diameter down to 0.2 mm or less). The boron yielding method includes a high temperature heat treatment after application of the low viscosity liquid medium. The boronized surface forms a hardness gradient, with an increased hardness of at least 50 to 200 HV5, alternatively at least 100 to 150 HV5, and favorable compressive stresses in a surface zone that gives a tougher internal diameter surface of the boronized drawing dies or nozzles.

It has now been shown that a binder phase-depletion zone extending from at least a portion of a working surface inward to a depth and that a hardness gradient can be formed in bores of various bodies and tools, such as drawing die nibs of ultra-fine WC-material (e.g., grain sizes with a diameter of less than or equal to 0.5 µm) with low binder-phase content (e.g., less than 6 wt. % binder phase) or binderless carbide and bores or channels in nozzles for water jet cutting equipment by using a low viscosity liquid medium of a boron yielding material, a solvent, and a surfactant. As disclosed herein, it is possible drawing dies or nozzles can minimize or completely avoid residues from the low viscosity liquid medium within the boronized sintered parts that makes it possible to boronize bores and channels, nozzles, and drawing die nibs with a diameter down to 0.2 mm or less. Also, a hardness gradient can be obtained in such boronized local areas by using boron containing low viscous liquid medium in, for example, the bore of the drawing dies or nozzles. The process also minimizes the formation of eta-phase which makes it possible to keep a good control of size and shape of the drawing dies or nozzles after the boronizing process.

The hardness gradient formed in the boronized surface has a high hardness and favorable compressive stresses in the surface zone that gives a tougher inner diameter surface of, e.g., boronized drawing dies and nozzles.

Embodiments disclosed herein include a sintered cemented carbide body, comprising an outer surface connecting a top surface to a bottom surface, and inner surfaces defining a bore extending through the sintered cemented carbide body from the top surface to the bottom surface. The sintered cemented carbide body has a composition including (i) at least one of WC and $W_2C$, (ii) a hard phase of a metal carbide, metal carbonitride or metal oxycarbonitride, and (iii) a binder phase. The inner surfaces include a working surface and the sintered cemented carbide body includes a binder phase-depletion zone extending from at least a portion of the working surface inward to a depth, wherein an amount of binder phase in the binder phase-depletion zone is less than 2.5 wt. %, and wherein the binder phase-depletion zone has a microstructure that includes an eta-phase with a grain size less than 6.0 µm.

Embodiments disclosed herein also include a method to manufacture a sintered cemented carbide body having a binder phase-depletion zone extending from a working surface inward to a depth. The method comprises sintering a cemented carbide body and treating at least a portion of the working surface with a boron yielding method, the boron yielding method including the steps of (a) applying a composition including boron or a boron containing material, a solvent, and a surfactant and (b) heating to a temperature in a range of 1200° C. to 1450° C., preferably at 1400° C. to 1420° C., under a pressure less than atmospheric pressure or in a hydrogen containing atmosphere. The sintered cemented carbide body has a composition including (i) at least one of WC and W2C, (ii) a hard phase of a metal carbide, metal carbonitride or metal oxycarbonitride, and (iii) a binder phase. The sintered cemented carbide body includes inner surfaces defining a bore extending through the sintered cemented carbide body from a top surface to a bottom surface, wherein the inner surfaces include a working surface, and the boron yielding method results in a binder phase-depletion zone extending from the at least a portion of the working surface treated with the boron yielding method inward to a depth, wherein an amount of binder phase in the binder phase-depletion zone is less than 2.5 wt. %, and wherein the binder phase-depletion zone has a microstructure that includes an eta-phase with a grain size less than 6.0 µm.

In some embodiments, the method optionally includes surface finishing at least the portion of the working surface of the sintered cemented carbide body prior to treating with the boron yielding method.

The sintered cemented carbide bodies and the methods to produce a binder phase-depletion zone can be used to manufacture cold forming tools, such as nibs for wire-drawing, and nozzles of water jet cutter equipment.

Experimentally, several drawing dies made of different grades of cemented carbide with a bore diameter of less than 3 mm and water jet nozzles made of binderless carbide or cemented carbide with a bore size of about 1 mm have been boronized for investigation and testing. The surface treatment was performed with a low viscosity liquid medium that included a boron compound, a solvent, and a surfactant applied onto the working surfaces of such sintered parts and boronized during heat treatment in vacuum at 1410° C.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

DETAILED DESCRIPTION

Figure 1A:
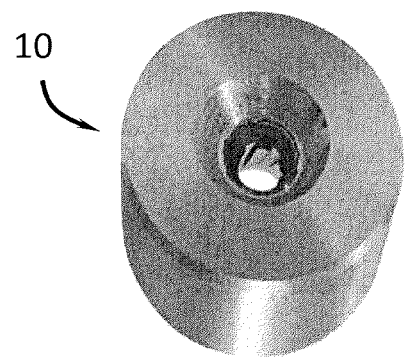
FIGS. 1A and 1B show an example of a conventional drawing die nib (FIG. 1A) and an example of a conventional nozzle for, e.g., water jet cutting equipment.
Figure 1B:
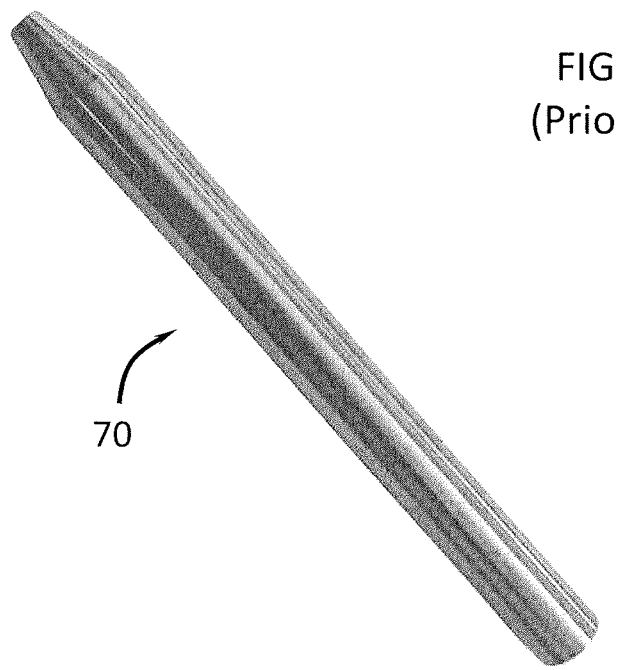

FIGS. 1A and 1B show an example of a conventional drawing die 10 (FIG. 1A) and an example of a conventional nozzle 70 (FIG. 1B) for, e.g., water jet cutting equipment.

Figure 2A:
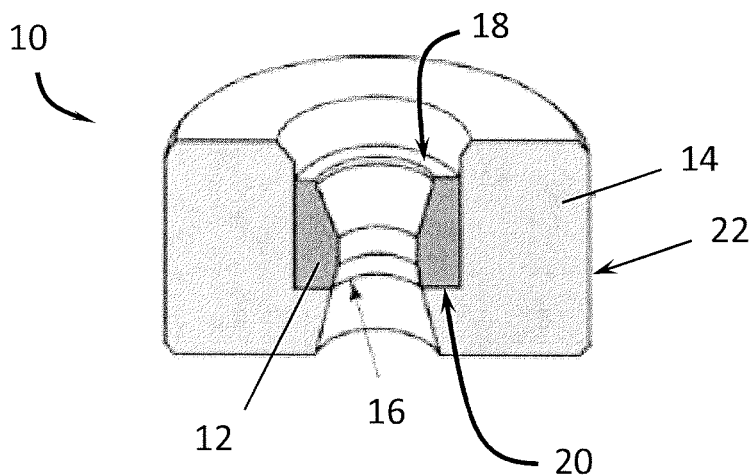
FIG. 2A show a cross-section of a drawing dies including a tungsten carbide or other hard metal insert (also called a nib) mounted in a supporting casing.

As seen in cross-section in FIG. 2A, drawing dies 10 include a tungsten carbide or other hard metal insert (also called a nib) 12 mounted in a supporting casing 14, usually of steel, which maintains compressive stresses around the drawing die. The nib 12 has inner surface(s) defining a bore 16 extending from a top surface 18 to a bottom surface 20. An outer surface 22 connects the top surface 18 to the bottom surface 20. In drawing operations, a wire or rod of steel, copper, other metals, or alloy enters into one side of the bore 16 and is lubricated and reduced in size as it is pulled through the bore 16 in the nib 12. The tip of the wire is typically guided into the die 10 and rolled onto a block (not shown) on the opposite side. The block provides the power to pull the wire through the die 10.

Figure 2B:
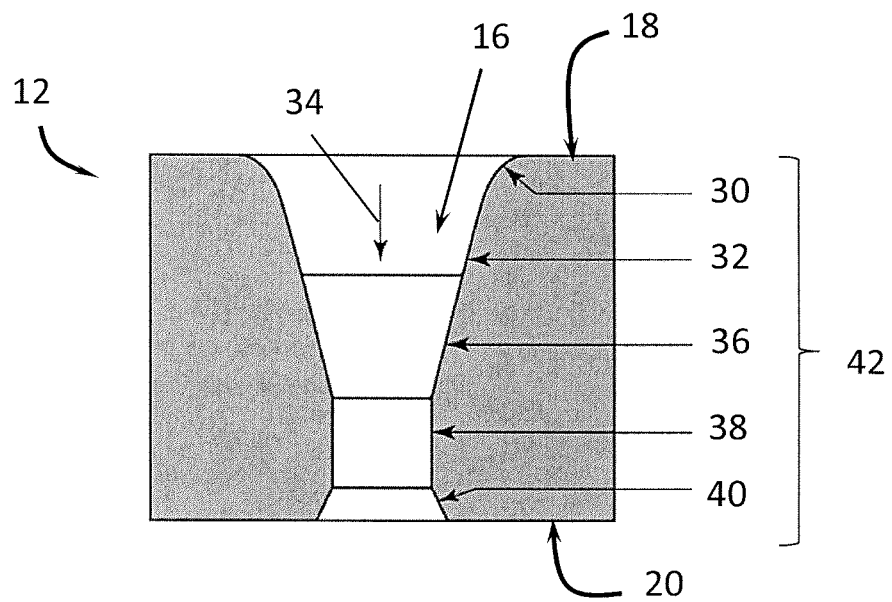
FIG. 2B shows a cross-section of a portion of an example nib, including the several different surface sections of the bore in the nib.

FIG. 2B shows a cross-section of a portion of an example nib 12 showing the nib 12 divided into several different sections. First, relative to the top surface 18 is a bell 30, which is typically a radiused surface, followed by an entrance angle 32 that guides the wire (which generally travels in the direction indicated by arrow 34). Next is the approach angle surface 36, which brings the wire further into the nib 12 and facilitates the reduction of the diameter or cross-section of the rod or wire being processed. Next is the bearing surface 38 followed by the back relief 40. Suitable lubrication is optionally added at the entrance angle, such as in powdered soap form. As is known in the art, the wire should not actually come in contact with the die so a thin coat of lubricant is typically used to prevent metal-to-metal contact. For pulling a substantial rod down to a fine wire, a series of several drawing dies can be used to obtain progressive reduction of the cross-section or diameter in stages. The type of wear/wear mechanisms that occur in the nib 12 include preferential wear at the entrance of the reduction zone, at the exit of the reduction zone/entrance of the bearing zone and at the exit of the bearing zone. In a Boron-treated nib as disclosed herein, the exit of the reduction zone shows less adhesive wear and less adherence of the working material as compared to a non-boron-treated nib.

A water jet cutter, also known as a water jet or waterjet, is an industrial tool capable of cutting a wide variety of materials using a very high-pressure jet of water, or a mixture of water and an abrasive substance, and can be used during fabrication of machine parts. As seen in cross-section in FIG. 2C, a water jet cutter 50 includes a nozzle 70, such as the nozzle 70 depicted in FIG. 1B. The nozzle 70 is connected to a body 52 of the water jet cutter 50, which includes a liquid medium supply portion 54 and (optionally) a mixing chamber 56. The liquid medium supply portion 54 includes a valve 58 that regulates the supply of liquid medium 60, typically pressurized water. When present, the mixing chamber 56 allows for the introduction of abrasive medium 62 into the water stream 64, which is further regulated by orifice 66. The water stream 64 (with our without abrasive medium) travels through the bore 72 of the nozzle 70 to an exit 74.

Sintered cemented carbide bodies for wear and abrasive applications, such as a drawing die nib 12 or a nozzle 70, as well as other structures such as seals and bearings, can have bodies made of a binderless carbide, cermet or cemented carbide having primarily hard phases with ultrafine grain size (i.e., a diameter of less than or equal to 0.5 μm, as measured by British Standard EN ISO 4499-2:2008, Part 2: Measurement of WC grain size, the contents of which are incorporated herein by reference) and low binder-phase content (between 2.5 and 6.0 wt. %). The sintered body includes tungsten carbide, in one or more of WC and W2C form, and/or eta-phase with a grain size less than 6.0 μm. The sintered body includes less than 6 wt. % binder phase (e.g., in some embodiments, a binder phase that includes an iron-group metal or a binder phase that includes at least one of Co, Ni, and Fe). The sintered body includes a surface treated with a boron yielding method (i.e., boronizing) that includes a low viscosity liquid medium having boron nitride component (i.e., including boron or a boron containing material), a solvent, and a surfactant.

In some embodiments and with reference to FIGS. 2A and 2B, the sintered cemented carbide body, such as nib 12, comprises an outer surface 22 connecting a top surface 16 to a bottom surface 20. Inner surface(s) define a bore 16 that extends through the sintered cemented carbide body from the top surface 16 to the bottom surface 20. The sintered cemented carbide body of the nib 12 has a composition including (i) at least one of WC and W2C, (ii) a hard phase of a metal carbide, metal carbonitride or metal oxycarbonitride, and (iii) a binder phase. In some embodiments, the at least one of WC and W2C is replaced by a binderless carbide (BC). In some embodiments, the binder phase is present in an amount up to and including 6 wt. %. In some embodiments, a mixture of WC and W2C is used.

The inner surface(s) of the bore 16 provide a working surface of the nib 12. For example, at least portions of the bore 16 that contact a wire drawn through the nib during a wire drawing operation are the working surface(s). Also for example, a working surface 42 of the nib 12 can be one or more of the bell 30, the entrance angle 32, the approach angle surface 36, the bearing surface 38, and the back relief surface 40. In some embodiments, the working surface is the entire length of the bore 16 and includes each of the bell 30, the entrance angle surface 32, the approach angle surface 36, the bearing surface 38, and the back relief surface 40. In other embodiments, the working surface is a subset of the entire length of the bore 16 and includes one or more of the bell 30, the entrance angle surface 32, the approach angle surface 36, the bearing surface 38, and the back relief surface 40. In some embodiments, at least the approach angle surface 36 and the bearing surface 38 are the working surface.

Figure 2C:
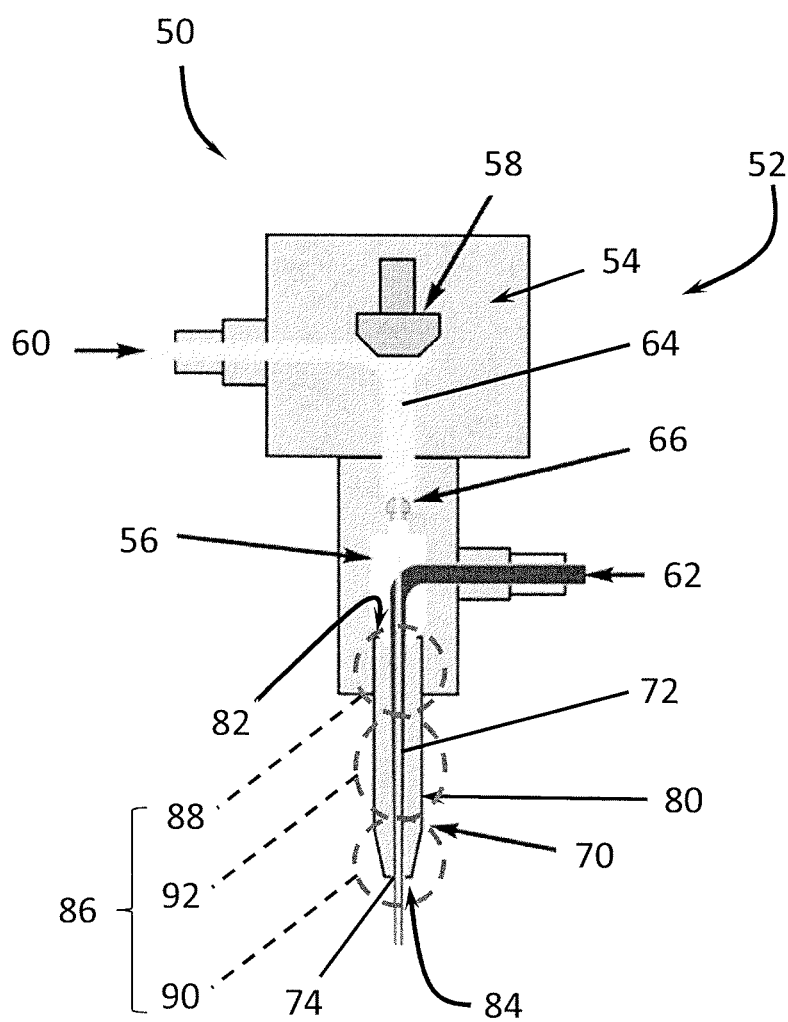
FIG. 2C shows a cross-section of a water jet cutter that includes a tungsten carbide or other hard metal nozzle.

In some embodiments and with reference to FIG. 2C, the sintered cemented carbide body, such as nozzle 70, comprises an outer surface 80 connecting a top surface 82 to a bottom surface 84. The bore 72 of the nozzle 70 is a hole or a channel that extends through the sintered cemented carbide body from the top surface 82 to the bottom surface 84. Typical sizes for the bore 72 of the nozzle are 1 mm to 2 mm in diameter. The sintered cemented carbide body of the nozzle 70 has a composition including (i) at least one of WC and W2C, (ii) a hard phase of a metal carbide, metal carbonitride or metal oxycarbonitride, and (iii) a binder phase. In some embodiments, the at least one of WC and W2C is replaced by a binderless carbide (BC). In some embodiments, the binder phase is present in an amount up to and including 6 wt. %. In some embodiments, a mixture of WC and W2C is used.

Inner surface(s) of the bore 72 (or hole or channel) of the nozzle 70 provide a working surface of the bore 72. For example, at least a portion of the bore 72 that is in contact with the water stream 64 flowing through the nozzle during a cutting operation is a working surface 86. The water stream 64 can contain water or contain a mixture of water and an abrasive substance. Also for example, a working surface 86 can be the inner diameter surface of the bore 72. In some embodiments, the working surface 86 is the entire length of the bore 72 and includes each of an entrance section 88 where the water stream 64 enters the bore 72 of the nozzle 70, an exit section 90 including the bore 72 of the nozzle 70 corresponding to where the nozzle outer surface is angled and extending to the exit 74, and an intermediate section 92 between the entrance section 88 and the exit section 90. In other embodiments, the working surface is a subset of the entire length of the bore 72 and includes one or more of the entrance section 88, the exit section 90, and the intermediate section 92. In some embodiments, at least the exit section 90 is the working surface. The bore 72 can show different wear along its length depending on the fluid speed and properties of the abrasive substances.

The sintered cemented carbide body includes a binder phase-depletion zone extending from at least a portion of the working surface inward to a depth. In some embodiments, the depth is between 5 μm and 25 μm; in other embodiments, the depth is up to 25 μm. An amount of binder phase in the binder phase-depletion zone can vary from as low as zero or greater than zero to a high of 10 wt. %, depending on the amount of binder phase present in the cemented carbide. Thus, for a cemented carbide composition with Co/binder-phase content of 0.8 wt. %, the amount of binder phase in the binder phase-depletion zone is zero of almost zero; for a cemented carbide composition with Co/binder-phase content of 6 wt. %, the amount of binder phase in the binder phase-depletion zone is 2.5 wt. % or less; for a cemented carbide composition with Co/binder-phase content of 15 wt. %, the amount of binder phase in the binder phase-depletion zone is 10 wt. %.

Additionally, the binder phase-depletion zone has a microstructure that includes an eta-phase with a grain size less than 6.0 μm. Such characteristics of the binder phase-depletion zone are observable using microscopy techniques, such as scanning electron microscopy (SEM) and light optical microscopy (LOM), and are also detectable using hardness mapping as a proxy, such as using Vickers Hardness HV5 as set forth in International Standard ISO 3878 (second edition, dated Aug. 15, 1983), the contents of which are incorporated herein by reference, and as discussed further herein.

For example, the binder phase-depletion zone can have a hardness gradient (in a direction perpendicular to the working surface 42, 86 inward to a depth) in which the hardness (measured using Vickers Hardness 5 (HV5)) at the working surface is at least 100 HV5, preferably 100 to 500 HV5, more preferably 100 to 200 HV5, greater than the hardness (measured using Vickers Hardness 5 (HV5)) at the depth, e.g., between 5 μm and 25 μm or at the depth of up to 25 μm, or at the depth at which the binder phase is no longer depleted, i.e., at the depth corresponding to the bulk or nominal composition of the cemented carbide (CC). In other embodiments, the hardness (measured using Vickers Hardness 5 (HV5)) at the working surface is 100 to 500 HV5 greater than the hardness (measured using Vickers Hardness 5 (HV5)) at the depth. In still other embodiments, the hardness (measured using Vickers Hardness 5 (HV5)) at the working surface is 100 to 200 HV5 greater than the hardness (measured using Vickers Hardness 5 (HV5)) at the depth. In further embodiments, the hardness (measured using Vickers Hardness 5 (HV5)) at the working surface is 1400 to 2300 HV5.

Figure 3:
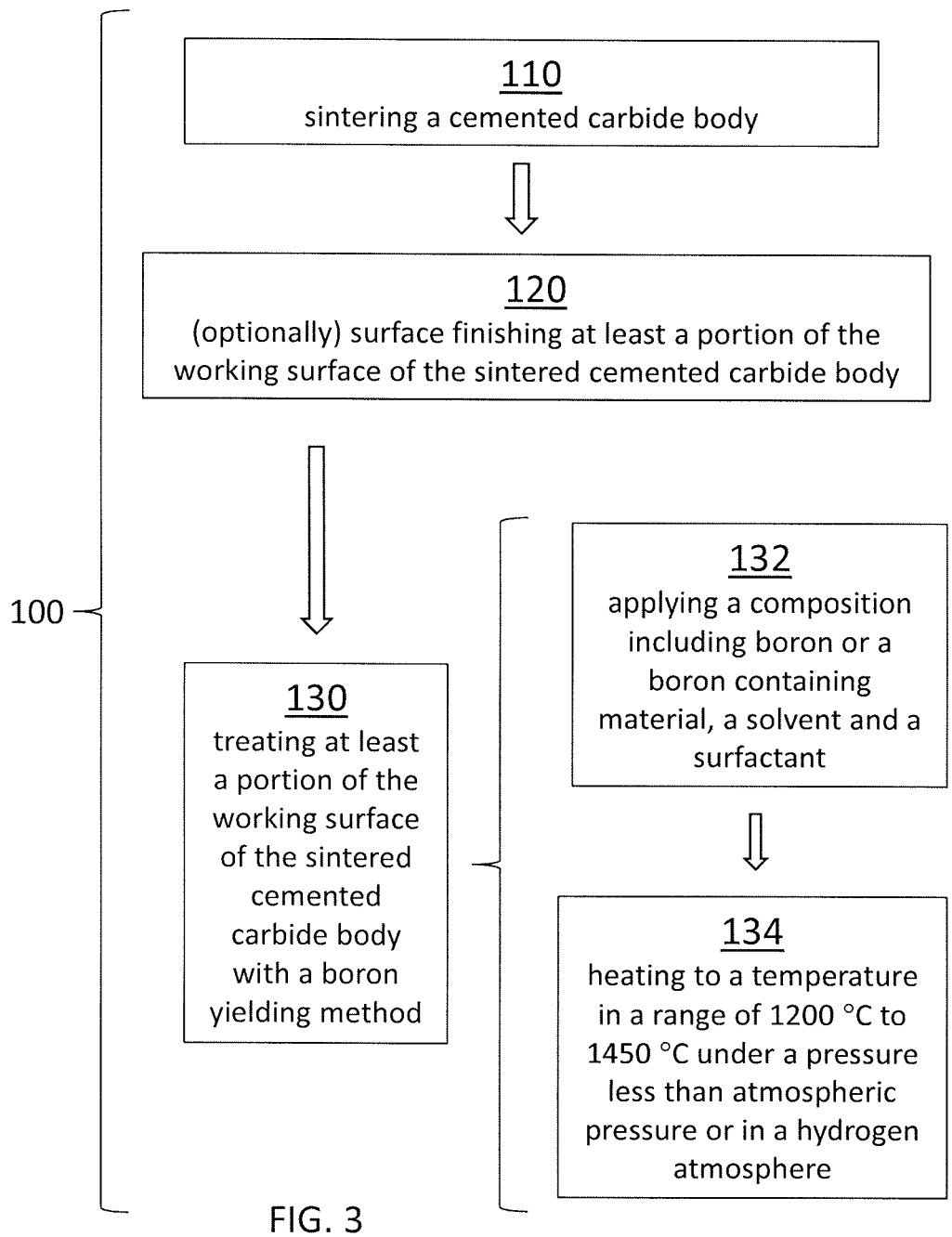
FIG. 3 outlines a method to manufacture a sintered cemented carbide body having a binder phase-depletion zone extending from a working surface inward to a depth.

As outlined in FIG. 3, a sintered cemented carbide body having a binder phase-depletion zone extending from a working surface inward to a depth can be manufactured by a method 100 that comprises 110 sintering a cemented carbide body, the sintered cemented carbide body including a bore extending through the sintered cemented carbide body from a top surface to a bottom surface, wherein surfaces of the bore define a working surface, and wherein the sintered cemented carbide body has a composition including (i) at least one of WC and W2C, (ii) a hard phase of a metal carbide, metal carbonitride or metal oxycarbonitride, and (iii) a binder phase. In some embodiments, the at least one of WC and W2C is replaced by a binderless carbide (BC). In some embodiments, the binder phase is present in an amount up to and including 6 wt. %. In some embodiments, a mixture of WC and W2C is used.

The method 100 also comprises 130 treating at least a portion of the working surface with a boron yielding method. Embodiments of the boron yielding method include the steps of 132 applying a composition including boron or a boron containing material, a solvent, and a surfactant to at least a portion of the working surface and 134 heating the treated working surface to a temperature in a range of 1200° C. to 1450° C., under a pressure less than atmospheric pressure or in a hydrogen containing atmosphere. In some embodiments, the temperature that is used during the heating step is 1400° C. to 1420° C. In some examples herein, the temperature of 1410° C. was used during the heating step.

Optionally, at least one or more portions of the working surface of the sintered cemented carbide body can be 120 surface finished prior to treating with the boron yielding method. In some embodiments, at least the one or more portions of the working surface of the sintered cemented carbide body to be treated with a boron yielding method can be surface finished prior to treating with the boron yielding method. By way of example, surface finishing can include one or more of laser cutting, electrical discharge machining, grinding, and/or polishing.

The composition applied in the boron yielding method includes boron or a boron containing material. In some embodiments, the boron containing material is boron nitride (BN), elemental boron, or mixtures thereof. The grain size of boron nitride can be less than or equal to 0.4 μm, less than or equal to 0.3 μm, or less than or equal to 0.2 μm. The amount of boron in the composition applied in the boron yielding method is up to 30 wt. %, preferably 18 wt. % to 22 wt. %. In some examples herein, the amount of boron in the composition applied in the boron yielding method is 21 wt. %.

Optionally, the composition applied in the boron yielding method can also include aluminum or an aluminum containing material. In some embodiments, the aluminum containing material is alumina ($Al_2O_3$). When present, the amount of aluminum in the composition applied in the boron yielding method is up to 20 wt. %, preferably 10 wt. % to 20 wt. %. In some examples herein, alumina was included in the composition applied in the boron yielding method and the composition was 10 wt. % boron nitride and 20 wt. % alumina. When the composition applied in the boron yielding method includes aluminum or an aluminum containing material, aluminum and aluminum containing material from the composition can remain as residues on the surface of the sintered cemented carbide body after heating. If aluminum containing residues (for example, in the form of alumina or Co-/Ni aluminide) are present on narrow bore surfaces, the sintered cemented carbide body can be cleaned, for example, by ultrasonic methods, to remove such residues.

Any solvent that produces a low viscosity liquid medium (where low viscosity means having, at 25° C., a viscosity equal to or less than the viscosity of water under similar conditions) can be used to form the composition applied in the boron yielding method solvent. In some embodiments, the solvent is non-polar to reduce flocculation of the boron containing material and/or the aluminum containing material. In some embodiments, the solvent is acetone. In other embodiments, ethanol can be used even though it is non-polar liquid as long as steps are taken to minimize flocculation.

Additionally, a surfactant, such as polyethylene glycol (PEG) can optionally be included in the composition. In some embodiments, the polyethylene glycol (PEG) has an average $M_n$~500.

Because the composition is formed into a low viscosity liquid medium, treating the working surface with a boron yielding method 130 can be by any suitable means, such as by spraying, applying with a brush or cloth, flowing the low viscosity liquid medium with the composition over the working surface, and submerging the working surface or portion thereof in a volume of the low viscosity liquid medium with the composition.

Treating at least a portion of the working surface of the sintered cemented carbide body with the boron yielding method 130 can be repeated multiple times to build up the amount of boron containing material on the at least a portion of the working surface. In some embodiments, treating at least a portion of the working surface of the sintered cemented carbide body with the boron yielding method 130 can be repeated two to twenty times.

Figure 4:
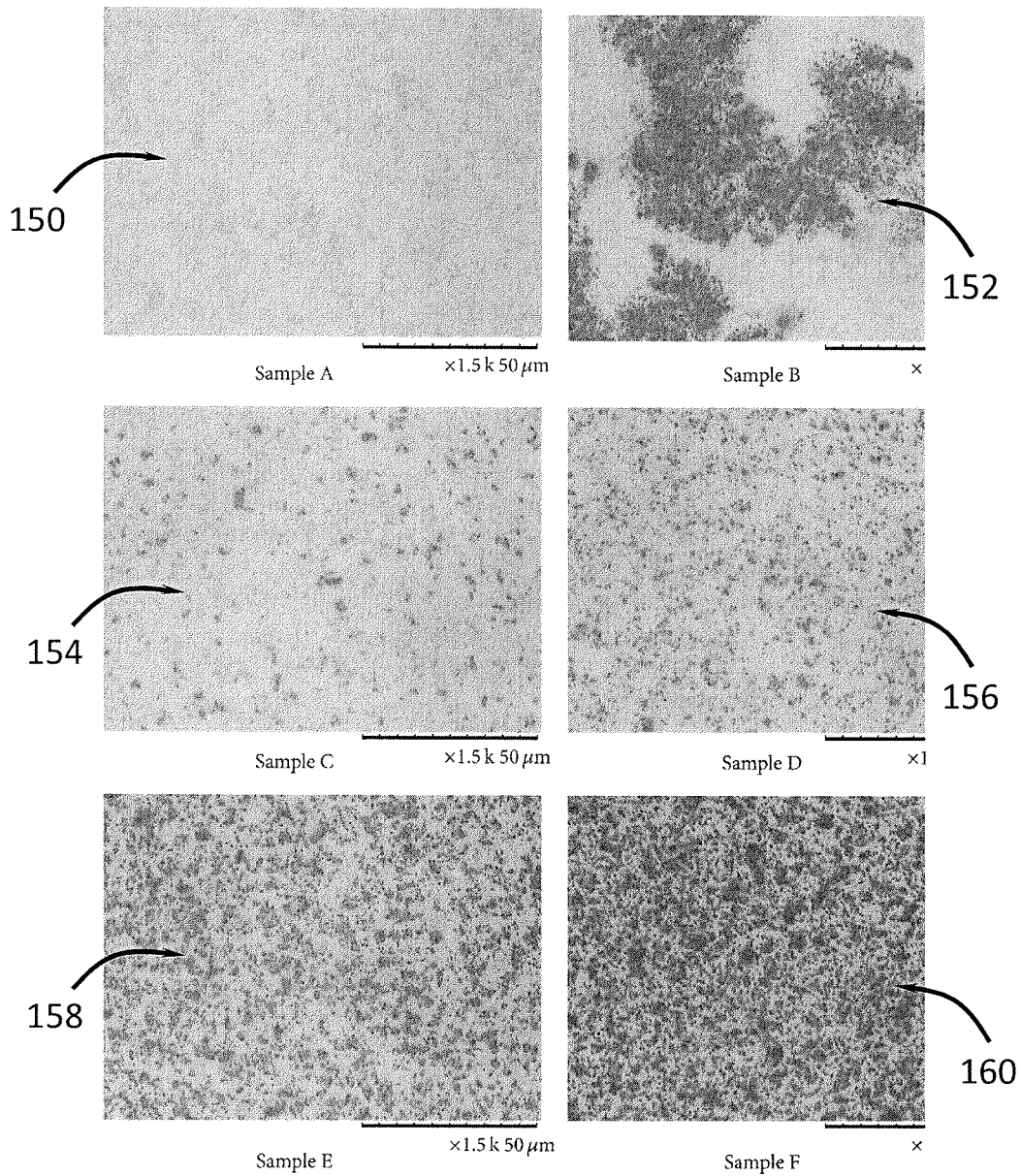
FIG. 4 are example micrographs at 1500× magnification of six samples (Samples A to F) showing examples of the eta-phase crystallites (darker areas) and demonstrating the grain size and morphology.

The boron yielding method results in a binder phase-depletion zone extending from the at least a portion of the working surface treated with the boron yielding method inward to a depth. In some embodiments, the depth is between 5 μm and 25 μm; in other embodiments, the depth is up to 25 μm. An amount of binder phase in the binder phase-depletion zone is less than 2.5 wt. %. Additionally, the binder phase-depletion zone has a microstructure that includes an eta-phase with a grain size less than 6.0 μm. FIG. 4 are example micrographs at 1500× magnification of six samples (Samples A to F) showing examples of the eta-phase crystallites (darker areas) and demonstrating the grain size and morphology. Sample A 150 corresponds to no eta phase. Sample B 152 shows eta-phase, which exhibit characteristic tendril-like or arm-like morphology. Sample C 154 shows eta-phase with a quasi-circular profile of medium size. Samples D 156, Sample E 158 and Sample F 160 shows eta-phase with a quasi-circular profile of medium and small size.

Characteristics of the binder phase-depletion zone are observable using microscopy techniques, such as scanning electron microscopy (SEM) and light optical microscopy (LOM), and are also detectable using hardness mapping as a proxy, such as using Vickers Hardness HV5 as set forth in International Standard ISO 3878 (second edition, dated Aug. 15, 1983), the contents of which are incorporated herein by reference, and as discussed further herein.

The presence of a binder phase-depletion zone affects the magnetic saturation of the sintered cemented carbide body. For example, a sintered cemented carbide body with a binder phase-depletion zone will have a lower or reduced magnetic saturation as compared to a sintered cemented carbide body without a binder phase-depletion zone. Similarly, a sintered cemented carbide body with a larger volume of a binder phase-depletion zone will have a lower magnetic saturation as compared to a sintered cemented carbide body with a smaller volume of a binder phase-depletion zone.

The effect on magnetic saturation on sintered cemented carbide bodies by the presence of a binder phase-depletion zone can be seen in the following Tables 1-5, which report test results on samples of five different grades of cemented carbide (Grade I, Grade II, Grade III, Grade IV, and Grade V) cemented carbide formed into nibs and having at least a portion of the working surface treated with a boron yielding method consistent with that disclosed herein. Samples in the following Tables 1-5 were treated with two different compositions: a first composition including 21 wt. % boron nitride (BN) powder in acetone and a second composition including 10 wt. % boron nitride (BN) powder and 20 wt. % alumina ($Al_2O_3$) powder in acetone. For each sample, the composition was applied to the surfaces of the bore of the nib and the samples heated to 1410° C. under a pressure less than atmospheric pressure. The magnetic saturation (reported in the form cobalt-magnetic ($M_{Co}$)) was determined for each sample pre-treatment and post-treatment.

TABLE 1

| | | Samples with First Composition | | | Samples with Second Composition | |
|---|---|---|---|---|---|---|
| Grade | Measurement | No 6 | No 7 | No 8 | No 9 | No 10 |
| I | Weight (g) before application of composition | 18.55 | 18.56 | 18.56 | 18.50 | 18.59 |
| | Weight (g) after application of composition | 18.58 | 18.59 | 18.6 | 18.53 | 18.65 |
| | Weight (g) after heating | 18.55 | 18.57 | 18.56 | 18.5 | 18.57 |
| | Magnetic saturation ($M_{Co}$) before heating | 2.82 | 2.63 | 2.78 | 2.75 | 2.55 |
| | Magnetic saturation ($M_{Co}$) after heating | 2.6 | 2.46 | 2.53 | 2.4 | 2.23 |

TABLE 2

| | | Samples with First Composition | | | Samples with Second Composition | |
|---|---|---|---|---|---|---|
| Grade | Measurement | No 16 | No 17 | No 18 | No 19 | No 20 |
| II | Weight (g) before application of composition | 19.16 | 19.15 | 19.12 | 19.20 | 19.16 |
| | Weight (g) after application of composition | 19.19 | 19.18 | 19.15 | 19.25 | 19.21 |
| | Weight (g) after heating | 19.16 | 19.15 | 19.12 | 19.19 | 19.16 |
| | Magnetic saturation ($M_{Co}$) before heating | 1.7 | 2 | 1.94 | 1.68 | 1.93 |
| | Magnetic saturation ($M_{Co}$) after heating | 1.53 | 1.69 | 1.66 | 1.45 | 1.65 |

TABLE 3

| | | Samples with First Composition | | | Samples with Second Composition | |
|---|---|---|---|---|---|---|
| Grade | Measurement | No 26 | No 27 | No 28 | No 29 | No 30 |
| III | Weight (g) before application of composition | 14.22 | 14.13 | 14.23 | 14.23 | 14.12 |
| | Weight (g) after application of composition | 14.25 | 14.17 | 14.28 | 14.31 | 14.22 |

TABLE 3-continued

| | | Samples with First Composition | | | Samples with Second Composition |
| --- | --- | --- | --- | --- | --- |
| Grade | Measurement | No 26 | No 27 | No 28 | No 29 | No 30 |
| | Weight (g) after heating | 14.23 | 14.13 | 14.24 | 14.23 | 14.12 |
| | Magnetic saturation ($M_{Co}$) before heating | 8.57 | 8.34 | 8.61 | 8.54 | 8.38 |
| | Magnetic saturation ($M_{Co}$) after heating | 7.47 | 7.43 | 7.34 | 7.14 | 6.98 |

TABLE 4

| | | Samples with First Composition | | | Samples with Second Composition |
| --- | --- | --- | --- | --- | --- |
| Grade | Measurement | No 36 | No 37 | No 38 | No 39 | No 40 |
| IV | Weight (g) before application of composition | 18.67 | 18.67 | 18.67 | 18.66 | 18.69 |
| | Weight (g) after application of composition | 18.71 | 18.7 | 18.7 | 18.71 | 18.72 |
| | Weight (g) after heating | 18.68 | 18.68 | 18.67 | 18.66 | 18.69 |
| | Magnetic saturation ($M_{Co}$) before heating | 5.22 | 5.22 | 5.24 | 5.21 | 5.22 |
| | Magnetic saturation ($M_{Co}$) after heating | 4.41 | 4.61 | 4.53 | 4.37 | 4.43 |

TABLE 5

| | | Samples with First Composition | | Samples with Second Composition |
| --- | --- | --- | --- | --- |
| Grade | Measurement | No 44 | No 45 | No 46 |
| V | Weight (g) before application of composition | 46.80 | 46.82 | 46.89 |
| | Weight (g) after application of composition | 46.93 | 46.91 | 47.02 |
| | Weight (g) after heating | 46.815 | 46.83 | 46.90 |
| | Magnetic saturation ($M_{Co}$) before heating | n.a. | n.a. | n.a. |
| | Magnetic saturation ($M_{Co}$) after heating | 11.64 | 11.99 | 11.47 |

As seen from the above Tables 1 to 5, the magnetic saturation ($M_{Co}$) after heating, i.e., after the boron yielding treatment, was lower than the magnetic saturation ($M_{Co}$) before heating, i.e., before the boron yielding treatment. This results indicates that measuring magnetic saturation ($M_{Co}$) can provide verification that a binder phase-depletion zone is present in a sintered cemented carbide body. For example, a lower measured magnetic saturation is indicative of a lower Co-content and formation of eta-phase. Furthermore, the amount of change in the measured magnetic saturation ($M_{Co}$) between before the boron yielding treatment and after the boron yielding treatment can be correlated to a degree of binder phase-depletion and even to a depth of the binder phase-depletion zone.

Figure 5A:
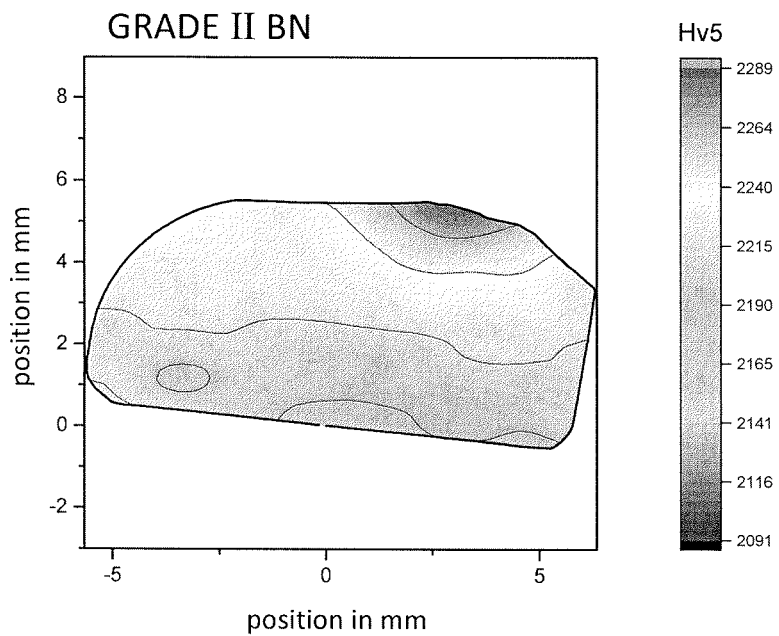
FIGS. 5A-B to 9A show results from hardness testing (HV5) on cross-sections of nibs made from various grades of cemented carbide (CC) and then subjected to a boron yielding method (the results showing hardness (HV5) as a function of position (both the X-axis and Y-Axis in mm relative to an arbitrary center at the zero position)).
Figure 5B:
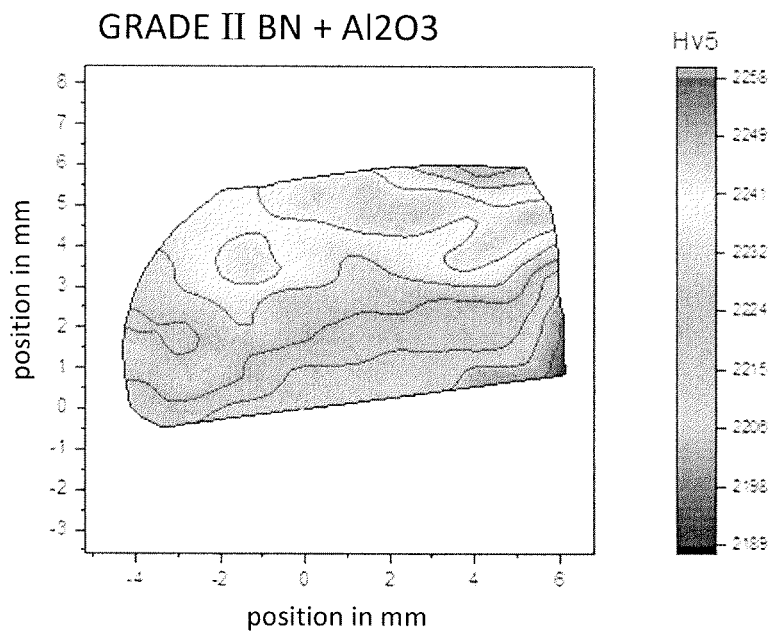
Figure 6A:
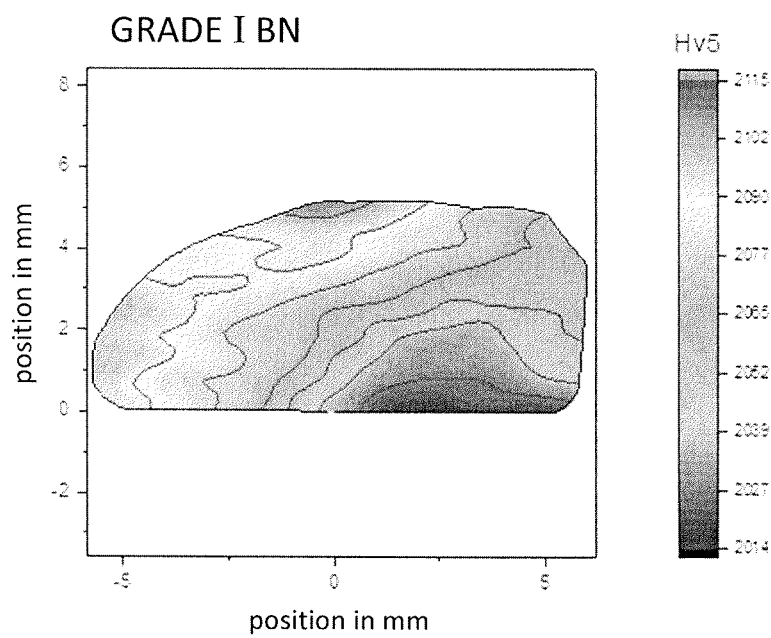
Figure 6B:
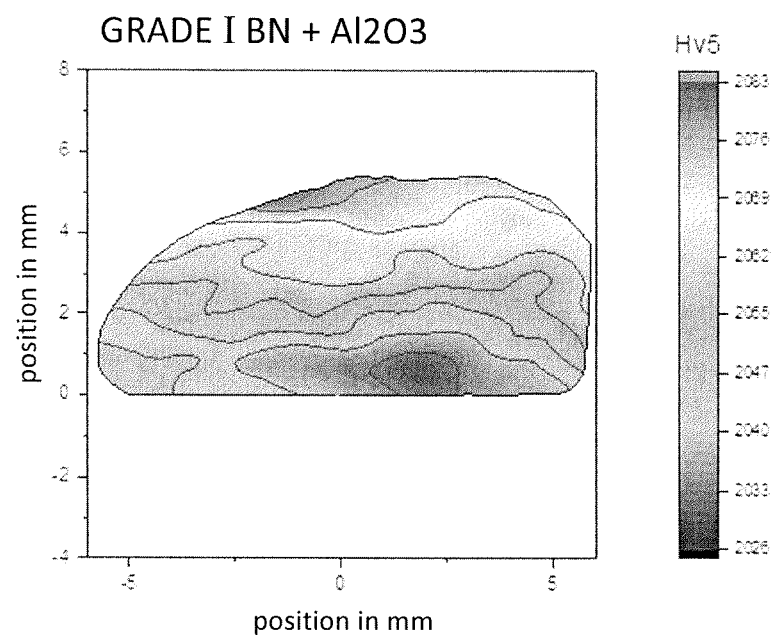
Figure 7A:
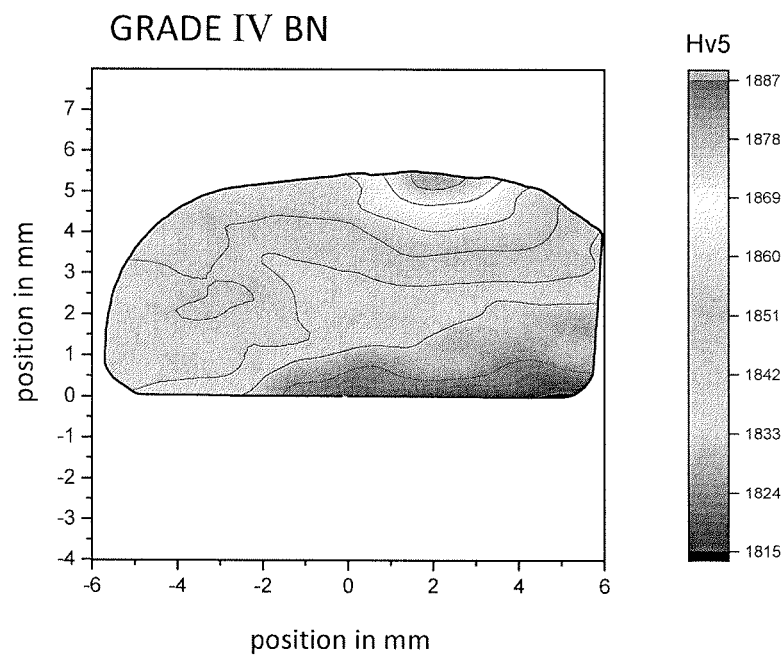
Figure 7B:
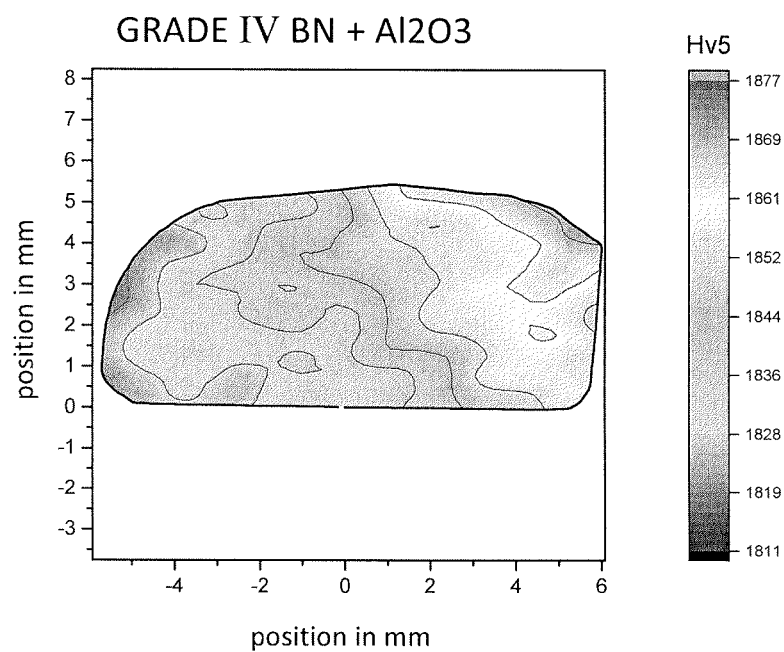
Figure 8A:
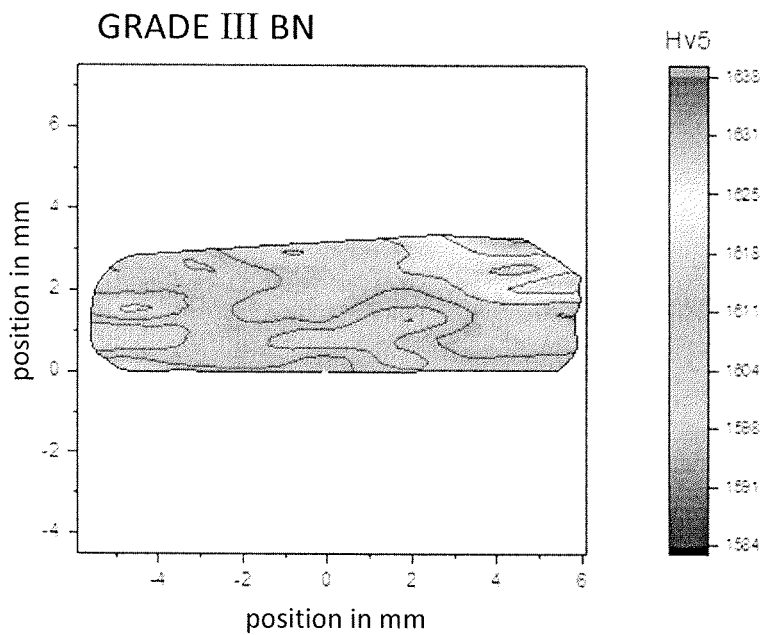
Figure 8B:
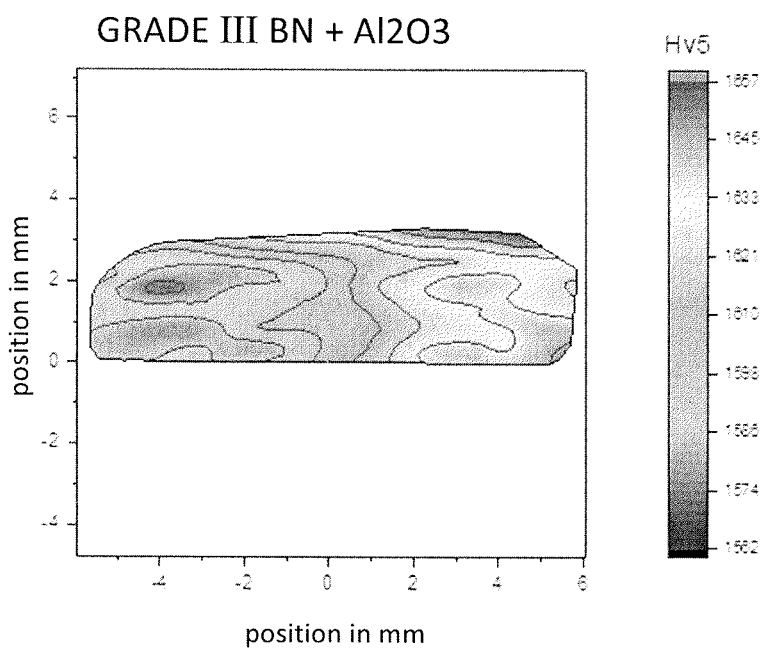
Figure 9A:
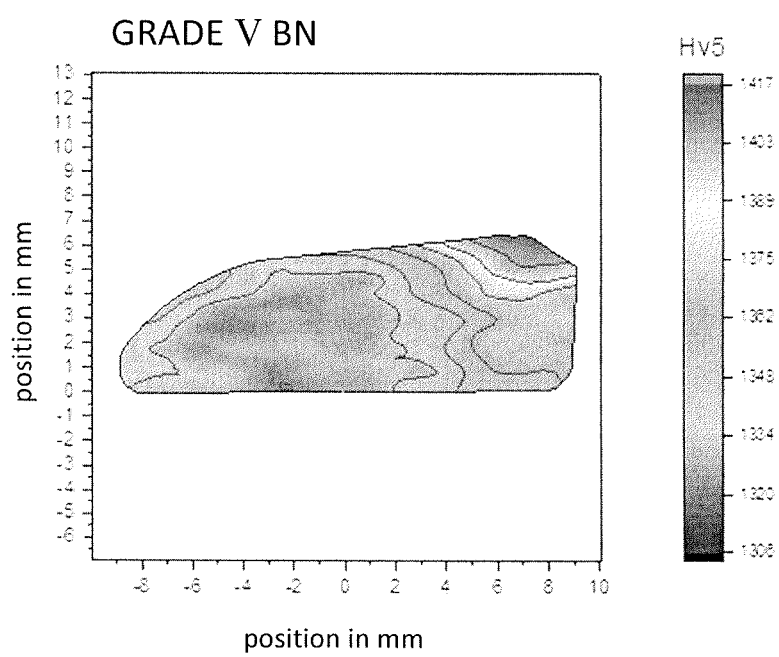
Figure 10A:
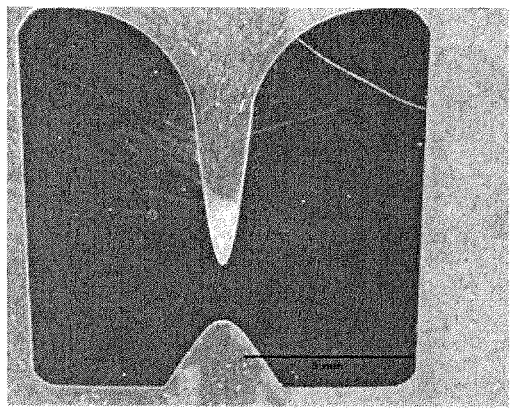
FIGS. 10A-B to FIGS. 16A-C are results of light optical microscopy (LOM) of samples of sintered cemented carbide bodies made using various grades of cemented carbide.
Figure 10B:
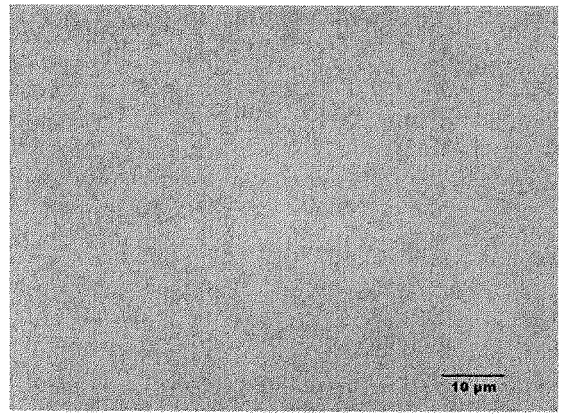

FIGS. 5A-B to 9A show results from hardness testing (HV5) on cross-sections of nibs made from various grades of WC and then subjected to a boron yielding method consistent with the method disclosed herein. The various grades were Grade II (FIGS. 5A-B), Grade I (FIGS. 6A-B), Grade IV (FIGS. 7A-B), Grade III (FIGS. 8A-B), and Grade V (FIG. 9A). For the results shown in FIGS. 5A-B to 9A, the results in the "A" figure are for a boron yielding method in which the composition included 21 wt. % boron nitride (BN) powder in acetone (the "BN treated variant") and the results in the "B" figure are for a boron yielding method in which the composition included 10 wt. % boron nitride (BN) powder and 20 wt. % alumina ($Al_2O_3$) powder in acetone (the "BN+$Al_2O_3$ treated variant"). For the results shown in FIGS. 5A-B to 9A, the composition was applied to the surfaces of the bore of the nib and the samples heated to 1410° C. under a pressure less than atmospheric pressure. After the boron yielding method, the samples were sectioned and the cross-sections examined and mapped for hardness (HV5). Hardness mapping refers to the creation of a comprehensive hardness result (which can be shown as a 2D image) for a specimen or a specific area using indentation tests with an equal distribution of test points across a specimen. In the hardness mapping, an increase in the HV5 value corresponds to the depletion of binder phase, e.g., the depletion of cobalt from that region of the sintered cemented carbide body.

Based on the hardness mapping results in FIGS. 5A-B to 9A, one can observe that the hardness (measured using Vickers Hardness 5 (HV5)) at the working surface is between (i) about 1420 HV5 for cemented carbide (CC) Grade V subject to a boron yielding method in which the composition included 21 wt. % boron nitride (BN) powder in acetone (FIG. 9A) and (ii) about 2260 HV5 for cemented carbide (CC) Grade II subject to a boron yielding method in which the composition included 10 wt. % boron nitride (BN)

powder and 20 wt. % alumina ($Al_2O_3$) powder in acetone (FIG. 5B) and (iii) about 2290 HV5 for cemented carbide (CC) Grade II subject to a boron yielding method in which the composition included 21 wt. % boron nitride (BN) powder in acetone (FIG. 5A). As a comparison, cemented carbide (CC) Grade V has a nominal hardness of 1300 HV5 and cemented carbide (CC) Grade II has a nominal hardness of 2090 HV5.

Also, across the grades depicted in FIGS. 5A-B to FIG. 9A, the difference in HV5 hardness across the gradient varies from about a difference of 54 HV5 for Grade III and about a difference of 72 HV5 for Grade IV, each subject to a boron yielding method in which the composition included 21 wt. % boron nitride (BN) powder in acetone (FIGS. 7A and 8A), to about a difference of 198 HV5 for Grade II subject to a boron yielding method in which the composition included 21 wt. % boron nitride (BN) powder in acetone (FIG. 5A). The difference in the hardness gradient in the samples with different binder-phase content in the cemented carbide grade is, at least in part, due to the "sourcing" of Boron/Boron+Alumina from the composition used in the boron yielding method, with grades with higher binder-phase content needing more boron from the boron yielding method to maintain a controlled hardness gradient.

In addition, sintered cemented carbide bodies made from Grade I to Grade IV and treated with the composition including 21 wt. % boron nitride (BN) powder in acetone show a gradient originating at the inner diameter of the bore in the vicinity of the approach angle surface 36 and the bearing surface 38. In sintered cemented carbide bodies of the same grades treated with the BN+$Al_2O_3$ composition, a similar gradient originating at the inner diameter of the bore in the vicinity of the approach angle surface 36 and the bearing surface 38 is shown. It should be noted that the BN+$Al_2O_3$ treated variant of Grade II (shown in FIG. 5B) did not display such a gradient due to over-treatment of the boron-yielding method, whereby the sample was saturated with boron and no binder-phase gradient could be attained. Also, the image in FIG. 5B is cropped so that back relief 40 is not shown in the figure.

Also, across the grades depicted in FIGS. 5A-B to FIG. 9A, the difference in HV5 hardness for any one grade is higher for the BN treated variant as compared to the BN+$Al_2O_3$ treated variant. In reaching this conclusion, the results for Grade III were not considered because, as noted above, the sample was subjected to too much grinding and polishing of the cross section which reduced the high hardness volume around the drawing channel. In some embodiments, the difference in HV5 hardness was about 130 HV5 (see FIGS. 5A and 5B, with a difference in HV5 hardness of 198 HV5 and 69 HV5 for the BN treated variant and BN+$Al_2O_3$ treated variant, respectively). In other embodiments, the difference in HV5 hardness was about 40 to 45 HV5 (see FIGS. 6A and 6B, with a difference in HV5 hardness of 101 HV5 and 57 HV5 for the BN treated variant and BN+$Al_2O_3$ treated variant, respectively).

Figure 11A:
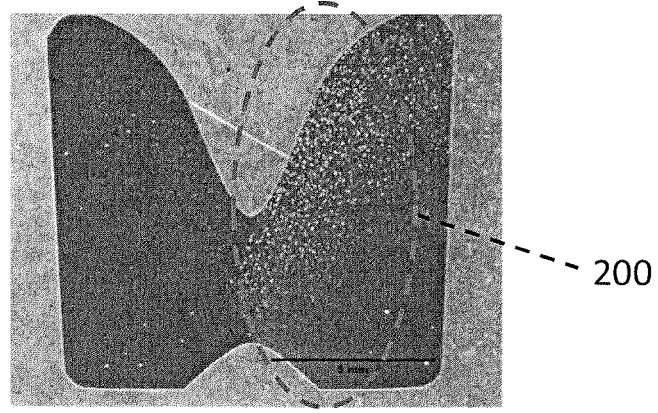
Figure 11B:
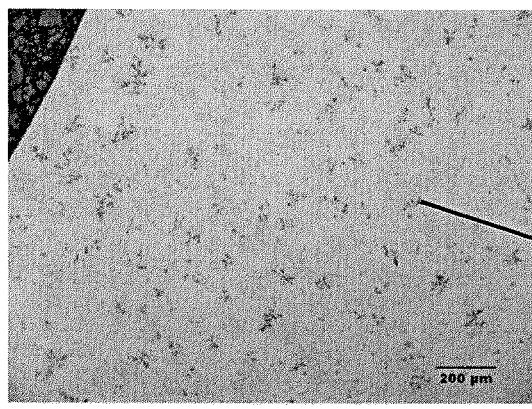
Figure 11C:
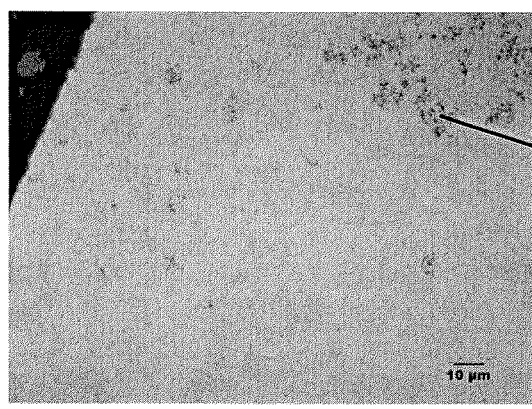
Figure 12A:
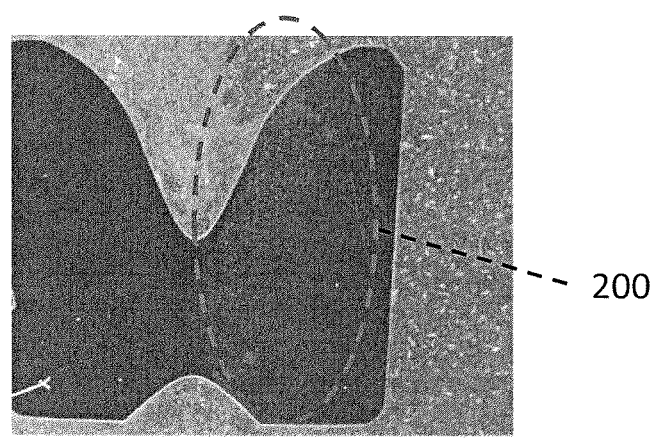
Figure 12B:
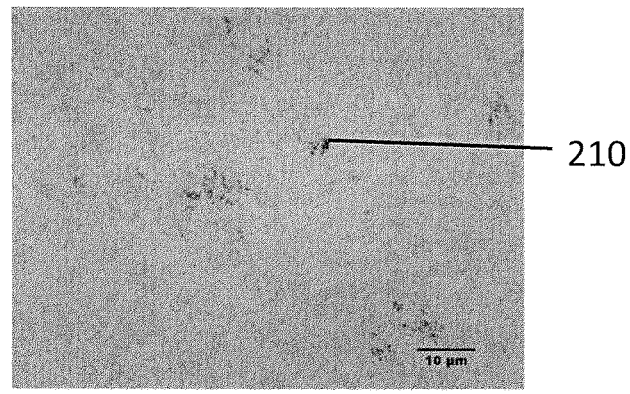
Figure 13A:
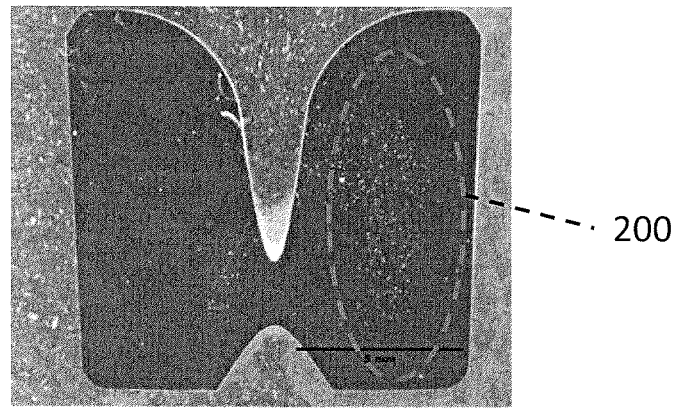
Figure 13B:
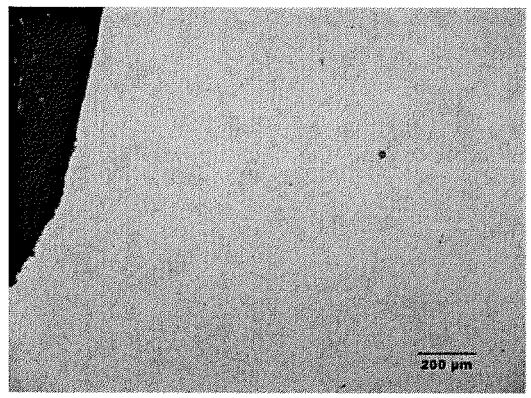
Figure 13C:
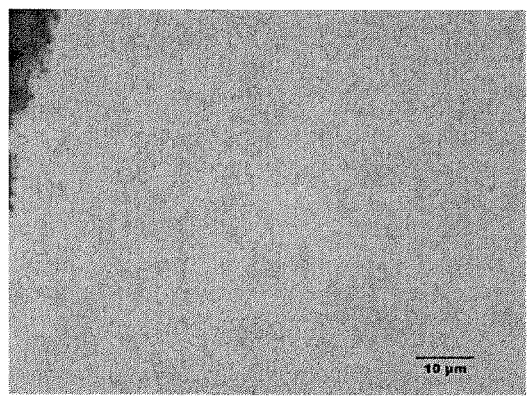
Figure 14A:
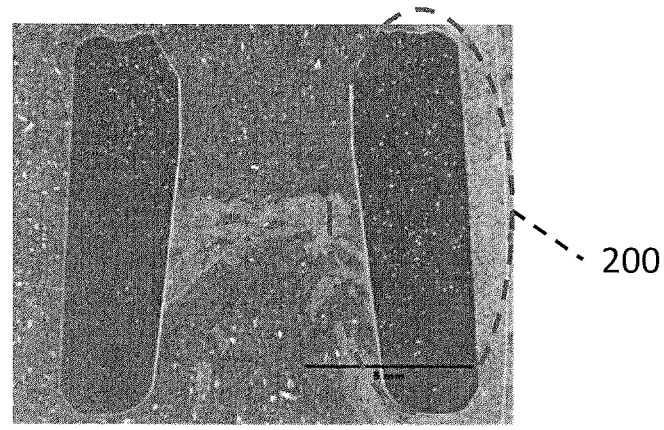
Figure 14B:
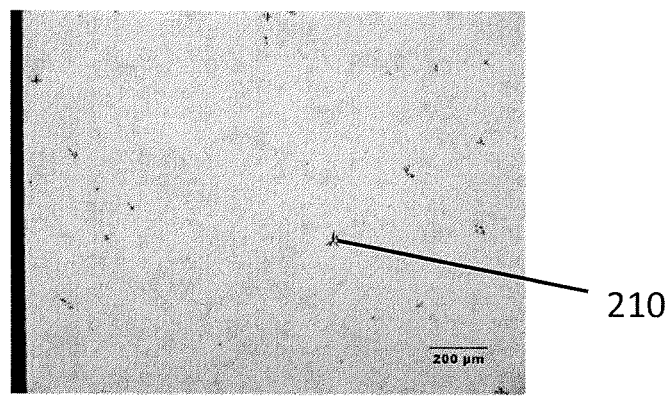
Figure 15A:
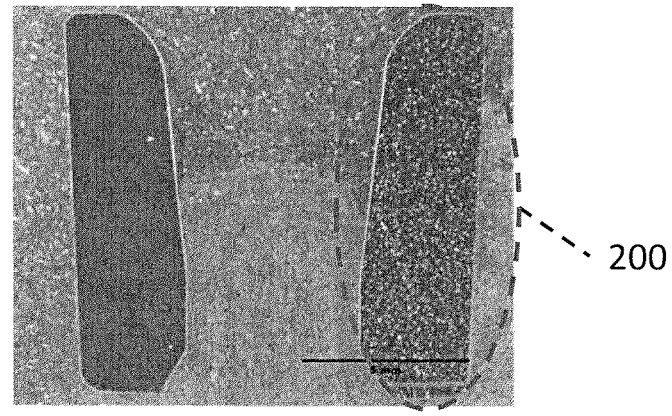
Figure 15B:
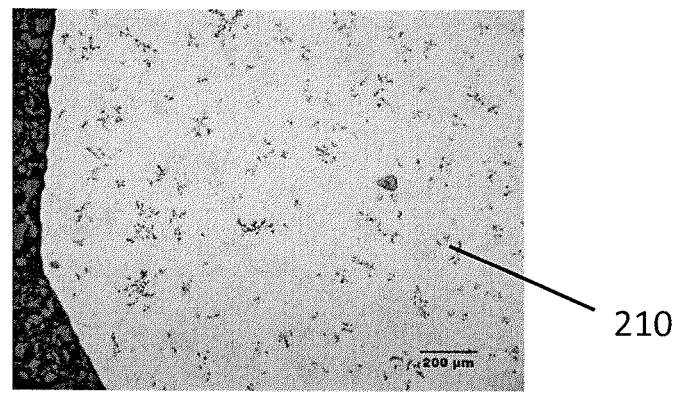
Figure 15C:
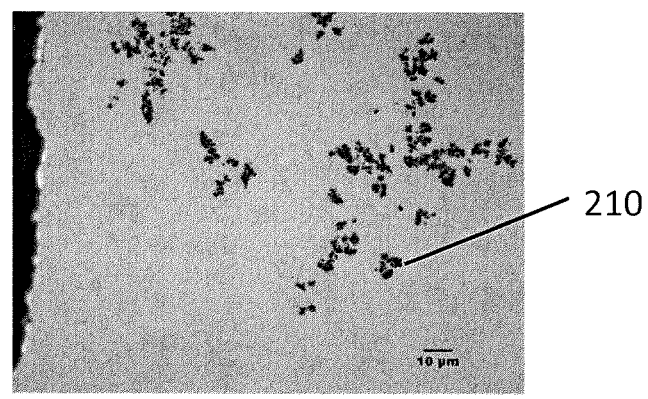
Figure 16A:
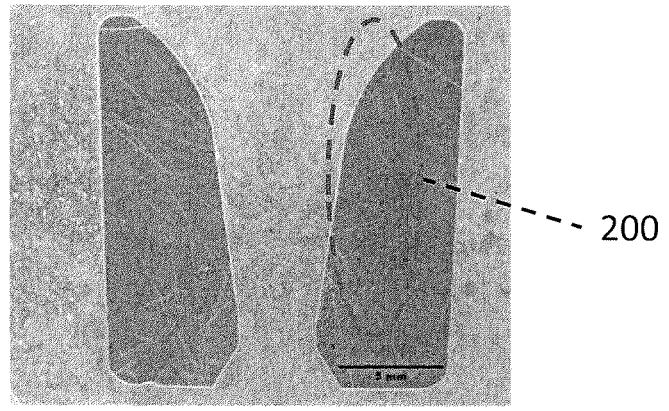
Figure 16B:
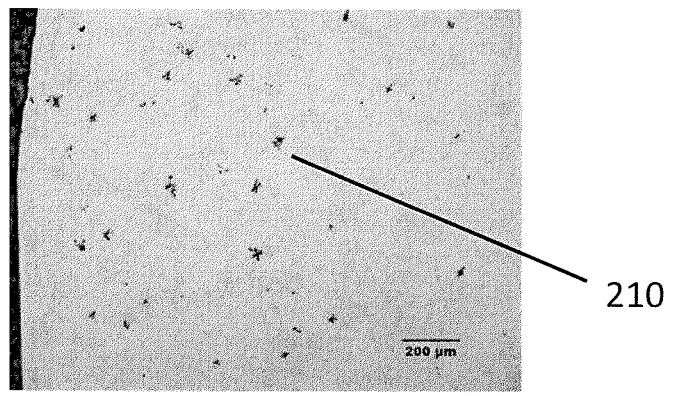
Figure 16C:
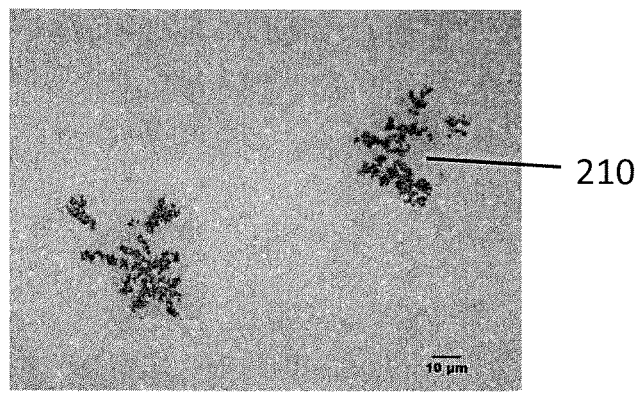

FIGS. 10A-B to FIGS. 16A-C are results of light optical microscopy (LOM) of samples of sintered cemented carbide bodies made using various grades of cemented carbide, including Grade II (corresponding to Sample No. 18 in Table 2) (FIGS. 10A-B), Grade I (corresponding to Sample No. 8 in Table 1) (FIGS. 11A-C), Grade I (corresponding to Sample No. 9 in Table 1) (FIGS. 12A-B), Grade IV (corresponding to Sample No. 38 in Table 4) (FIGS. 13A-C), Grade III (corresponding to Sample No. 26 in Table 3) (FIGS. 14A-C), Grade III (corresponding to Sample No. 30 in Table 3) (FIGS. FIGS. 15A-C), and Grade V (corresponding to Sample No. 46 in Table 5) (FIGS. 16A-C). The sintered cemented carbide bodies of the various grades were subject to either the BN treated variant (FIGS. 10A-B, 11A-C, 13A-C, and 14A-C) or the BN+$Al_2O_3$ treated variant (FIGS. 12A-B, 15A-C, and 16A-C), as defined above. Metallurgical analysis of the sintered cemented carbide bodies before and after treatment with a boron yielding method have shown a dense microstructure with smooth working surfaces.

In each of the LOM images in the "A" images, the nibs have been treated with the boron yielding method, with the portion of the nib cross-section on the left half image being further treated by polishing and the portion of the nib cross-section on the right half in the image being further treated with Murakami 10% to eta-phase etch the sample. Any eta-phase is observed as areas 200 of white spots in the "A" figures. To further study the presence of eta-phase in these samples, the areas treated with the boron yielding method were subjected to Murakami etching and then observed with a LOM at higher magnifications. In such images, the eta-phase (if observable) appears as darker regions within a light-colored matrix (see, for example, eta-phase 210). Overall, the LOM images in FIGS. 10A-B to FIGS. 16A-C exhibit a diffuse eta-phase that is generally distributed throughout the whole cross-section of the body, in particular in the area of the working surfaces, which increases hardness (conversely, a concentrated eta-phase would be detrimental in that it contributes to lower toughness). However, in some LOM images, no eta-phase was observable, particularly in the area close to the working surface (see, for example, FIGS. 10A-B, FIGS. 13A-C) due to the diffuse nature of the eta-phase in these samples, although in FIG. 13A, eta-phase was observable in the bulk of the sintered cemented carbide body.

Figure 14C:
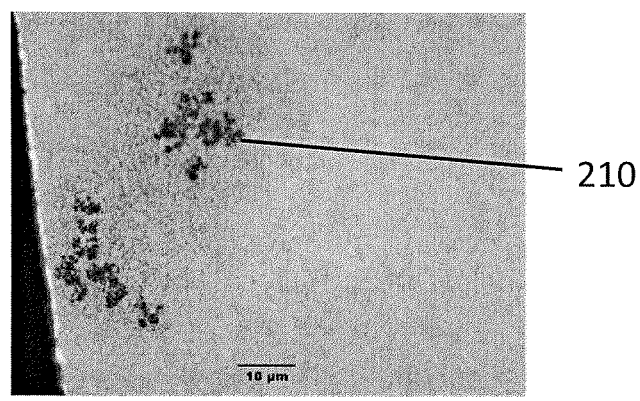

It should be noted that the sample in FIG. 14C has been slightly over-etched, so the microstructure of the cemented carbide is observed in between the eta-phase. It should also be noted that the even distribution of eta-phase in FIG. 16A indicates the that nib has been "overtreated" with the boron yielding method.

Turing to testing conducted on sintered cemented carbide bodies in the form of a nozzle, two types of samples were made. A first sample used Grade II cemented carbide; as second sample used a binderless carbide (BC) grade of tungsten carbide (hereafter designated as grade MoBC). The nozzle blanks had a bore diameter (size of the hole or channel) of 1.00 mm for grade MoBC and 1.02 mm for Grade II. Based on observations on the as-sintered blanks, the MoBC grade samples had a dense microstructure with cubic carbides and the surface of the bore was smooth and with nano-porosity in the outermost bore surface, while the Grade II samples had a dense microstructure with few, if any, cubic carbides and the surface of the bore was smooth and had a thin Co-coating with a thickness about 1 μm. The sintered blanks were then treated with a boron yielding method consistent with that disclosed herein.

The sintered and boronized samples were then tested for bulk hardness (HV3) of the working surface and the microstructure observed. The hardness and the microstructure were tested and observed both prior to and after treatment with the boron yielding method.

Figure 17A:
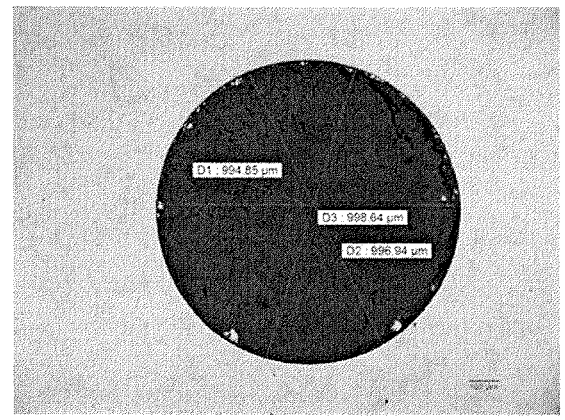
FIGS. 17A-C show microscope images related to samples of nozzles made with grade MoBC (a binderless carbide) and prior to treatment of those samples with the boron yielding method.
Figure 17B:
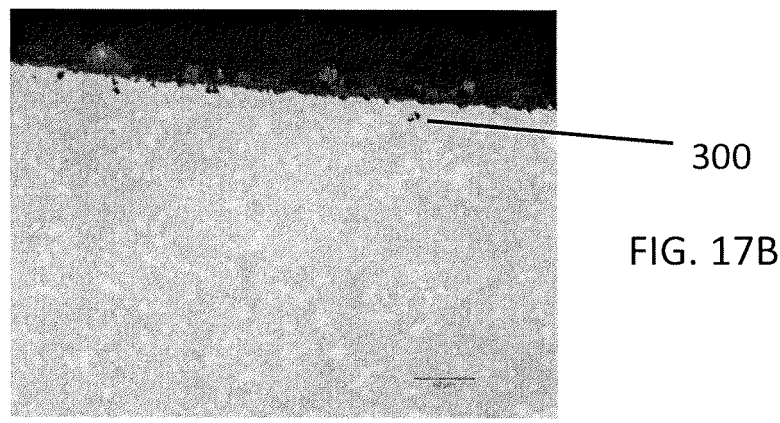
Figure 17C:
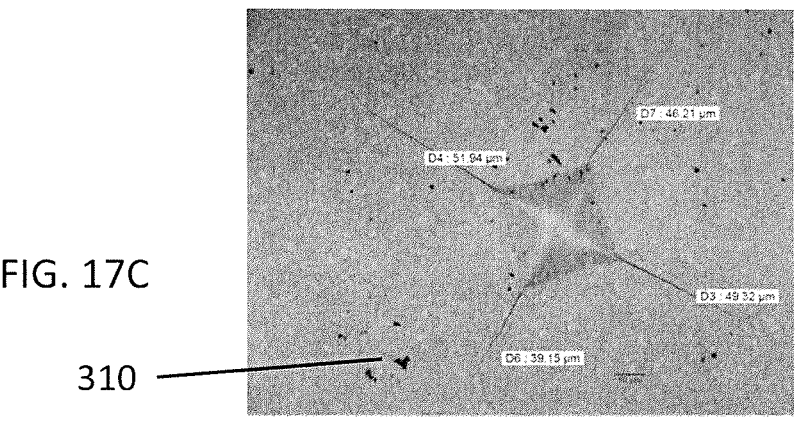

FIGS. 17A-C show microscope images related to samples of nozzles made with grade MoBC and prior to treatment of those samples with the boron yielding method. FIG. 17A shows the bore of the nozzle blank, which was about 996 μm in diameter. FIG. 17B is a LOM image showing minor amounts of porosity 300 close to the inner diameter surface of the bore. FIG. 17C is an image of the HV3 indentation used to determine bulk hardness. The crack length is 47 μm and there is nano-porosity 310 observed in the microstructure.

Figure 18A:
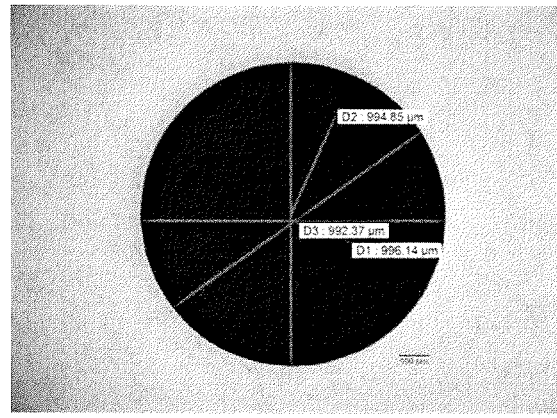
FIGS. 18A-C show microscope images related to samples of nozzles made with grade MoBC (a binderless carbide) and after treatment of those samples with the boron yielding method.
Figure 18B:
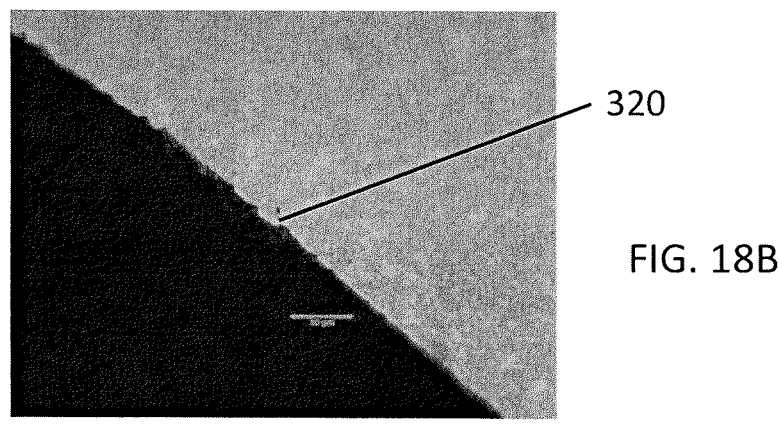
Figure 18C:
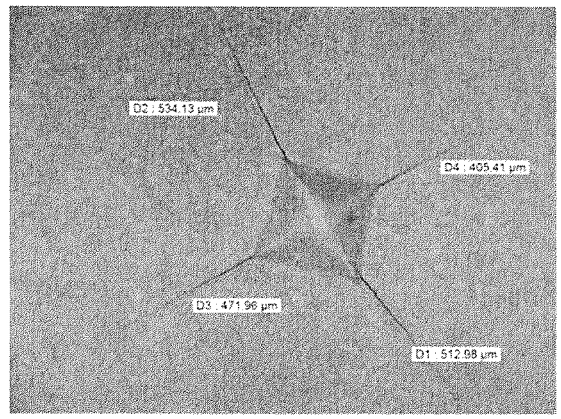

FIGS. 18A-C show microscope images related to samples of nozzles made with grade MoBC and after treatment of those samples with the boron yielding method. FIG. 18A shows the bore of the nozzle blank, which was about 994 μm in diameter. FIG. 18B is a LOM image showing the inner diameter surface of the bore. In the image in FIG. 18B, there is no observable porosity close to the inner diameter surface of the bore and there is a cobalt coating 320 on the inner diameter surface of the bore. FIG. 18C is an image of the HV3 indentation used to determine bulk hardness. The crack length is 48 μm and there is no observed nano-porosity in the microstructure.

Figure 19A:
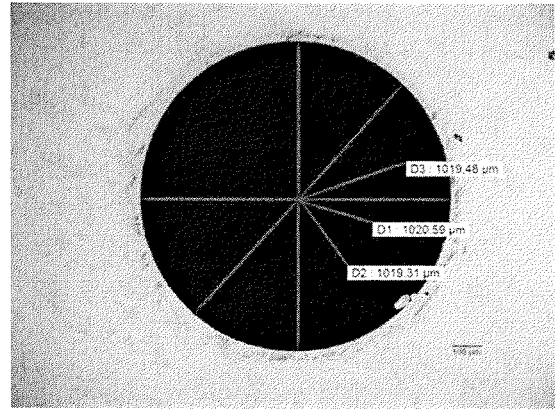
FIGS. 19A-C show microscope images related to samples of nozzles made of cemented carbide (CC) Grade H and prior to treatment of those samples with the boron yielding method.
Figure 19B:
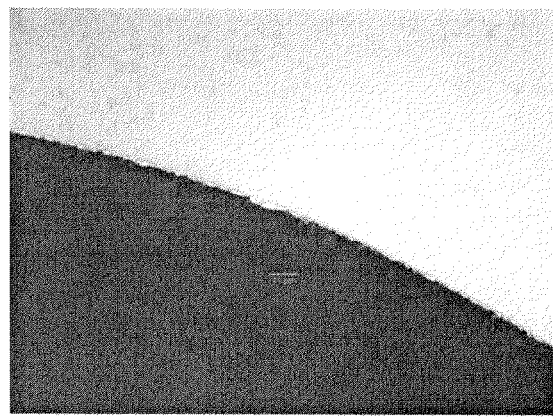
Figure 19C:
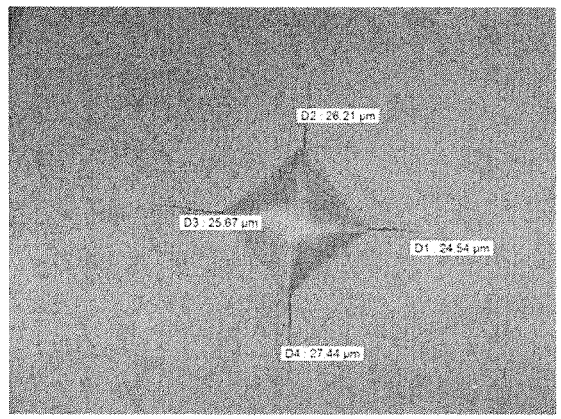

FIGS. 19A-C show microscope images related to samples of nozzles made with Grade H and prior to treatment of those samples with the boron yielding method. FIG. 19A shows the bore of the nozzle blank, which was about 1020 μm in diameter. FIG. 19B is a LOM image showing no amounts of porosity close to the inner diameter surface of the bore. FIG. 19C is an image of the HV3 indentation used to determine bulk hardness. The crack length is 28 μm and there is no observed nano-porosity 310 in the microstructure.

Figure 20A:
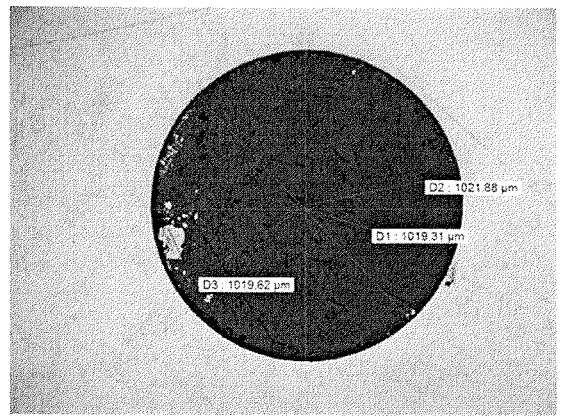
FIGS. 20A-C show microscope images related to samples of nozzles made with Grade II and after treatment of those samples with the boron yielding method.
Figure 20B:
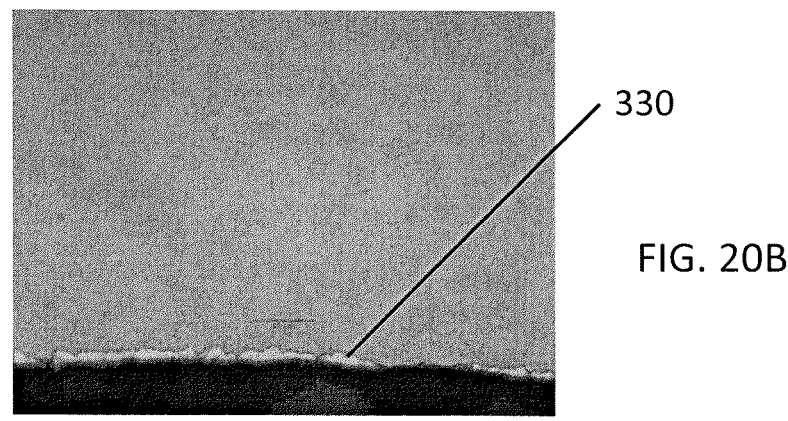
Figure 20C:
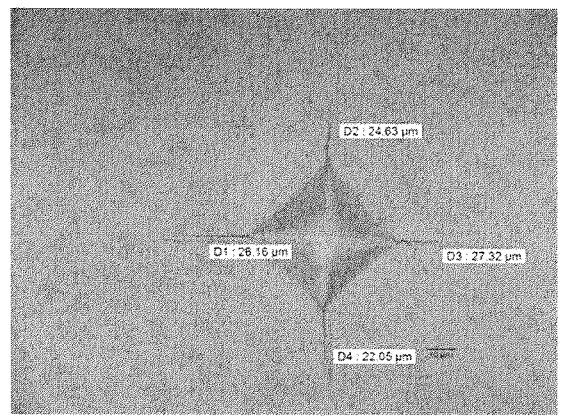

FIGS. 20A-C show microscope images related to samples of nozzles made with Grade II and after treatment of those samples with the boron yielding method. FIG. 20A shows the bore of the nozzle blank, which was about 1020 μm in diameter. FIG. 20B is a LOM image showing the inner diameter surface of the bore. In the image in FIG. 20B, there is no observable porosity close to the inner diameter surface of the bore and there is a cobalt coating 330 on the inner diameter surface of the bore. FIG. 20C is an image of the HV3 indentation used to determine bulk hardness. The crack length is 25 μm and there is no observed nano-porosity in the microstructure.

Table 6 below summarizes the bulk hardness (HV3) of the samples. The highest hardness obtained for the samples was obtained close to the bore surface and was 2350 HV3 for samples made using grade MoBC and was 2250 HV3 for samples made using Grade

TABLE 6

| Grade | Bulk hardness (HV3) prior to treatment with boron yielding method | Bulk hardness (HV3) after treatment with boron yielding method |
|---|---|---|
| II | 2160 HV3 | 2180 HV3 |
| MoBC | 2270 HV3 | 2290 HV3 |

Note:
The Vickers hardness has been determined with a weight of 3 kg.

Figure 21:
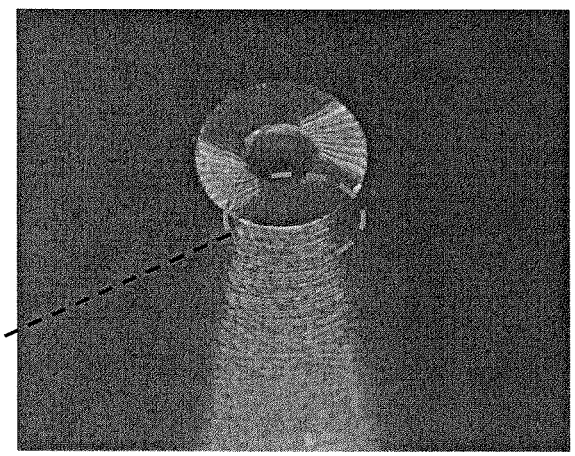
FIG. 21 shows an image of a sample of a nozzle made from Grade II.

FIG. 21 shows an exit 74 on the bottom surface 84 and the exterior angled surface of a nozzle 70 made from Grade II. As seen in FIG. 21, the outer diameter of the bottom surface 84 on the nozzle 70 made from Grade II (see area 400 in FIG. 21) is lightly worn and pitted. Observations on the inner diameter of the bore 72 (or hole or channel) of the nozzle 70 made from Grade II in the area adjacent the bottom surface 84 have small pittings due to wear from the water stream, indicating that a nozzle made from Grade II has sufficient toughness to reduce the wear rate for the water stream. A similar sample nozzle made from grade MoBC showed an increase in cutting performance from 4 hours, 30 mins without Boron-treatment to 6 hours, 30 mins with Boron-treatment.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method of manufacturing a sintered cemented carbide body having a binder phase-depletion zone extending from at least a portion of a working surface inward to a depth, the method comprising:
   sintering the cemented carbide body including inner surfaces defining a bore including the working surface, the bore extending through the sintered cemented carbide body from a top surface to a bottom surface, the sintered cemented carbide body having a composition including (i) at least one of WC and $W_2C$, (ii) a hard phase of a metal carbide, a metal carbonitride or a metal oxycarbonitride, and (iii) a binder phase; and
   treating at least a portion of the working surface of the bore with a boron yielding method by (a) applying a composition including boron or a boron containing material, a solvent, and a surfactant, and (b) heating to a temperature in a range of from 1400° C. to 1420° C. under a pressure less than atmospheric pressure, or in a hydrogen-containing atmosphere,
   wherein the boron yielding method forms a binder phase-depletion zone extending from at least a portion of the working surface treated with the boron yielding method inward to the depth,
   and an amount of the binder phase in the binder phase-depletion zone is less than 2.5 wt. % based on a total weight of the cemented carbide body, and
   wherein the binder phase-depletion zone has a microstructure including an eta-phase with a grain size less than 6.0 μm.

2. The method according to claim 1, further comprising surface finishing the at least a portion of the working surface of the sintered cemented carbide body prior to treating with the boron yielding method.

3. The method according to claim 1, wherein the composition applied in the boron yielding method includes aluminum or an aluminum-containing material, and the method of manufacturing the sintered cemented carbide body further comprises cleaning the sintered cemented carbide body after the boron yielding method.

4. The method according to claim 3, wherein an amount of the aluminum in the composition applied in the boron yielding method is up to 20 wt. %.

5. The method according to claim 1, wherein the boron containing material is boron nitride (BN).

6. The method according to claim 1, wherein an amount of the boron in the composition applied in the boron yielding method is up to 30 wt. %.

7. The method according to claim 1, wherein the solvent is a non-polar solvent.

8. The method according to claim 1, wherein the solvent is acetone.

9. The method according to claim 1, wherein the surfactant is polyethylene glycol (PEG).

10. The method according to claim 1, wherein the at least a portion of the working surface treated with the boron yielding method is one or more of a bearing surface, and an approach angle surface of a nib for wire drawing.

11. The method according to claim 1, wherein the at least a portion of the working surface treated with the boron yielding method is an interior surface of a nozzle of a water jet cutter.

* * * * *